No. 642,811. Patented Feb. 6, 1900.
R. COWEN.
VEHICLE TIRE.
(Application filed Aug. 16, 1897.)
(No Model.)
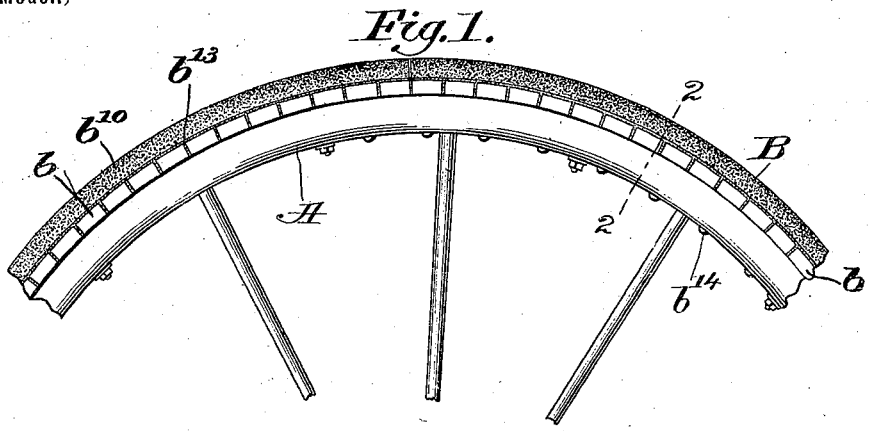
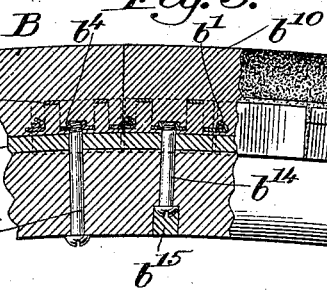 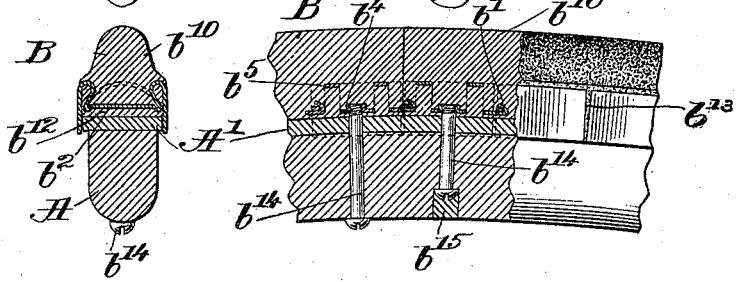
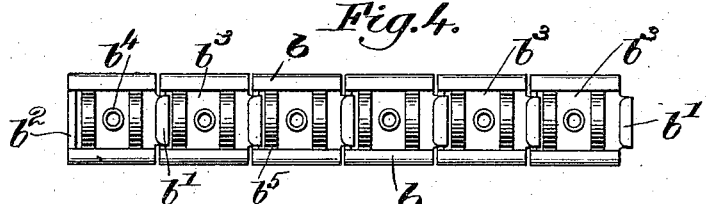
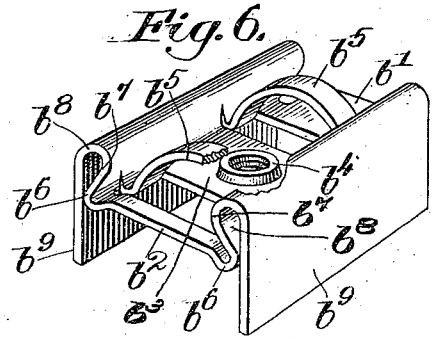
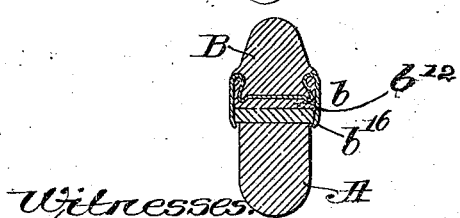
Witnesses:
A. C. Harmon
Fred S. Greenleaf
Inventor:
Robert Cowen
by Crosby & Gregory
attys.

UNITED STATES PATENT OFFICE.

ROBERT COWEN, OF CAMBRIDGE, MASSACHUSETTS.

VEHICLE-TIRE.

SPECIFICATION forming part of Letters Patent No. 642,811, dated February 6, 1900.

Application filed August 16, 1897. Serial No. 648,383. (No model.)

*To all whom it may concern:*

Be it known that I, ROBERT COWEN, of Cambridge, county of Middlesex, State of Massachusetts, have invented an Improvement in Vehicle-Tires, of which the following description, in connection with the accompanying drawings, is a specification, like letters on the drawings representing like parts.

My invention is an improved tire for road-vehicles, being particularly intended for the better class of carriages and carts, whereby they may be readily equipped with a yielding tread-surface.

The main object of my invention is to provide a tire which may be readily conformed to different-sized wheels and rigidly and positively secured directly thereto, being also durable, compact, and inexpensive, and presenting at the same time a neat and attractive appearance.

In general terms my invention comprises a linked or flexible carrier or supporting-plate for the tread member or tire proper, and to this carrier is permanently secured a usual yielding or rubber tire or tread surface, the rubber being interlocked therewith in such a manner that it presents an extremely-finished appearance and also is extremely durable and immovably secured.

By having the tire capable of flexure throughout its length it is readily adaptable to various-sized wheels without any special conformation thereto in its manufacture, as has heretofore been necessary, especially in tires for the heavier class of vehicles.

The details of construction of my invention will be more particularly pointed out in the following description, and the invention will be hereinafter defined in the appended claims, also forming a part of this specification.

In the accompanying drawings, which show one embodiment of my invention, Figure 1 is a fragmentary front elevation thereof, showing my improved tire applied to a usual vehicle-wheel. Fig. 2 is a transverse section thereof on the line 2 2, Fig. 1. Fig. 3 is an enlarged side elevation, partly in section, showing the details of construction thereof and the manner of securing the tire to the wheel-felly. Fig. 4 is a top plan of the carrier or supporting-plate of the tire. Fig. 5 is a side elevation illustrating the preferred method of constructing my tire. Fig. 6 is an enlarged perspective view, parts being broken away, showing one of the links of the carrier. Fig. 7 is a view similar to Fig. 2, it showing a slight modification thereof.

In the drawings, A designates a usual wheel of any construction, which may or may not be provided with a usual steel tire $A'$, and on this wheel I have shown my improved tire B.

The supporting-plate or carrier for the tire proper is herein shown as composed of a plurality of links $b$, which may be coupled together to any extent by suitable means, projecting tongues $b'$ being herein shown as hooked over bars $b^2$ in order to give the desired amount of rigidity to the carrier and yet permit the required amount of flexure therein in order to accommodate the tire to large and small wheels.

Referring to Fig. 6, it will be seen that each link is struck from a piece of sheet metal, preferably steel, having the bar $b^2$ and tongue $b'$ at the opposite ends thereof and midway of these provided with a bridge $b^3$, having a threaded boss $b^4$ at its center, and adjacent either side of the bridge is a retaining-arch $b^5$, the sides of the link being formed by crimping the plate upwardly at $b^6$ and inwardly at $b^7$ to form a sort of dovetailed central portion for the upper side of the link, in which the rubber is to be secured, as is clearly shown in Figs. 2 and 7, and the link being bent over, forming a loop $b^8$, and downwardly at $b^9$, the opposite sides $b^9$ being approximately parallel and extending below the rest of the link in order to embrace the sides of the felly A or tire $A'$, and the loops or upwardly-extending portions of the sides inclosing the tread member to guard and retain it.

It being understood that a carrier or supporting-plate made up of a plurality of links such as I have described is provided, the yielding portion $b^{10}$ is secured thereto as follows: The carrier is placed in a mold of proper shape to form the desired tread portion $b^{10}$ and rubber is placed in position on top of the carrier, pressure being then applied in order to compress the rubber and also force it within all the cavities of the carrier, so that the rubber shall solidly fill every crevice and bend of the carrier and preferably so that it shall form a thin layer beneath the bar $b^2$, bridge $b^3$, &c., as indicated at $b^{12}$, to cushion the tire between the links and wheel-rim, and then, the carrier being bent as shown in full lines, Fig. 5, the rubber is vulcanized. The result is that the tire is given a permanent form having the rubber in its normal tension when the tire is bent to as small a curve as the aperture $b^{13}$ between the links will permit, and this curvature being less than that of the usual wheel to which the tire is to be attached it follows that when the tire is straightened more or less—for instance, as shown in dotted lines, Fig. 5—in order to fit it to the wheel to which it is to be attached the tread-surface of the rubber will be put under more or less compression, and therefore be made to offer more resistance and wear better than if the tire were vulcanized in the first place at the curvature to which it is to be used.

Having provided the complete tire as above described and the rubber having been bored out from the screw-holes $b^4$ or the mold originally having been made of a shape to prevent the rubber from filling said holes, the tire will be applied to the wheel and cut off into proper length, so that the ends thereof will abut tightly, as clearly shown in Fig. 3. Screws $b^{14}$ will then be inserted through the felly into such of the links as it is found necessary in order to hold the tire with sufficient security, these screws being countersunk, if desired, and the holes filled in with plugs $b^{15}$ (see Fig. 3) if extreme neatness is desired. By this provision it is evident that the tire is positively secured to the wheel rim or felly, so that no matter what strain is brought to bear upon the tire it cannot possibly be pulled loose from the wheel. The rubber is so embedded and interlocked with its carrier that it is practically as strong as though it were one piece, and then in addition to this solid strong construction the screws, entering, as they do, from the felly side and screwing into the carrier at as many places as desired, render the tire absolutely rigid, permanent, and immovable. In case the yielding tire has been secured over the usual steel tire A' the depending sides $b^9$ of the links may, if desired, be bent under the steel tire, as shown at $b^{16}$, Fig. 7.

It will be understood from the above description and the drawings that my invention provides a tire capable of application to any-sized wheel and from which the rubber portion of the tire cannot possibly become loosened and cannot be injured by the carrier and which, by reason of the fact that the rubber enters all the openings in and between the links, presents an absolutely smooth surface exterior, it being understood that the rubber fills the crevices $b^{13}$ between the links as well as all other openings thereof. The sides of the carrier extend in planes parallel to that of the wheel, so that the sides of the tire consist of the inelastic metallic sections or sides of the links joined in one smooth external surface therewith by the elastic portions of the rubber, which come flush with the link-sections at $b^{13}$. This feature also renders the tire absolutely noiseless, inasmuch as no metal is permitted to contact with any other metal, but, on the contrary, every portion thereof is surrounded or packed with the rubber.

One main advantage of my invention besides the permanency and positive securing of the tire is that the tire may be quickly put on by any wheelwright or, in fact, by any one unskilled in such matters.

Heretofore in the matter of yielding tires of this class, so far as I am aware, it has been necessary to form the tire for the particular size of wheel to which it is to be attached, and it has also been necessary to have more or less intricate machinery for securing the same in position, whereas all this is obviated by my invention, and, moreover, it will be understood that, if desired, the tire may be applied to the wheel in sections, so that if one section thereof becomes injured it can be replaced without necessitating renewing the whole tire.

Various changes and modifications may be resorted to without departing from the spirit and scope of my invention, and I do not otherwise limit my invention than as hereinafter defined in the claims.

I do not herein claim, broadly, the provision in connection with a yielding tread member of flexible securing means for said tread member including a carrier having retaining-arches extending into and permanently embedded in the tread member, said securing means being capable of bending longitudinally more or less, inasmuch as the same constitutes a part of the subject-matter of my copending application, Serial No. 704,477, and is therein claimed.

Having described my invention, what I claim as new, and desire to secure by Letters Patent, is—

1. A tire, consisting of a yielding tread member, and a supporting member or carrier, said carrier comprising connected links, provided with retaining-arches extending up into and permanently embedded in the tread member, substantially as described.

2. A tire, consisting of a yielding tread member, and a supporting member or carrier, permanently held together, said carrier comprising connected links having at each side upturned sides inclosing said tread member to guard and retain it, substantially as described.

3. A tire, consisting of a yielding tread member, and a supporting member or carrier, said carrier comprising connected links having at each side upturned sides inclosing said tread member, the inner surfaces of said sides approaching each other to constitute a dovetail to hold the tread member, substantially as described.

4. A tire, consisting of a yielding tread member, and a supporting member or carrier, said carrier comprising connected links having their sides looped upwardly to inclose the tread member, and the free ends of said sides extending downwardly to lap over the rim of the wheel, substantially as described.

5. A tire, consisting of a yielding tread member, and a supporting member or carrier, said carrier comprising connected links having their sides looped upwardly to inclose the tread member, and the free ends of said sides extending downwardly to lap over the rim of the wheel, said links being separated from each other at their sides, and the yielding material of said tread member entering between said links and within said side loops, substantially as described.

6. A tire, consisting of a yielding tread member, and a supporting member or carrier, said carrier comprising connected links provided with interiorly-threaded bosses or screw-holes to receive screws from the wheel-rim, substantially as described.

7. A tire, consisting of a yielding tread member, and a supporting member or carrier, said carrier comprising connected links, the yielding material of said tread member being formed integrally above and below said links, the former for the tread proper and the latter to cushion the tire between the links and the wheel-rim, substantially as described.

8. A flexible tire, having sides extending in planes parallel to that of the wheel, said sides consisting of inelastic sections or links joined in one smooth external surface therewith by elastic portions, substantially as described.

In testimony whereof I have signed my name to this specification in the presence of two subscribing witnesses.

ROBERT COWEN.

Witnesses:
CHARLES E. JOLL,
GEORGE W. WHITTEMORE.